(12) United States Patent
Elias et al.

(10) Patent No.: US 9,985,991 B2
(45) Date of Patent: May 29, 2018

(54) HTTP PASSWORD MEDIATOR

(71) Applicant: Red Hat, Inc., Raleigh, NC (US)

(72) Inventors: Filip Elias, Raleigh, NC (US); Filip Nguyen, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 51 days.

(21) Appl. No.: 13/777,987

(22) Filed: Feb. 26, 2013

(65) Prior Publication Data

US 2014/0245372 A1    Aug. 28, 2014

(51) Int. Cl.
*H04L 29/06* (2006.01)
*G06F 21/55* (2013.01)
*G06F 21/62* (2013.01)

(52) U.S. Cl.
CPC ............ *H04L 63/20* (2013.01); *G06F 21/554* (2013.01); *G06F 21/6218* (2013.01)

(58) Field of Classification Search
CPC ......... H04L 29/06; H04L 63/20; G06F 15/16; G06F 21/62; G06F 21/554
See application file for complete search history.

(56) References Cited

U.S. PATENT DOCUMENTS

| | | | |
|---|---|---|---|
| 6,092,196 A * | 7/2000 | Reiche .............................. | 726/6 |
| 6,233,618 B1 * | 5/2001 | Shannon ........................ | 709/229 |
| 6,463,474 B1 * | 10/2002 | Fuh et al. ...................... | 709/225 |
| 6,859,878 B1 * | 2/2005 | Kerr ........................ | G06F 21/41 380/241 |
| 8,079,066 B1 * | 12/2011 | Cordell .................... | G06F 21/41 713/150 |
| 8,266,680 B2 * | 9/2012 | James et al. ...................... | 726/4 |
| 2002/0091757 A1 * | 7/2002 | Cuomo .............. | H04L 63/0281 709/203 |
| 2004/0158746 A1 * | 8/2004 | Hu .......................... | G06F 21/41 726/8 |
| 2005/0268345 A1 * | 12/2005 | Harrison ............... | G06F 21/305 726/27 |
| 2006/0021004 A1 * | 1/2006 | Moran et al. ..................... | 726/2 |
| 2007/0214499 A1 * | 9/2007 | Clymer et al. .................... | 726/4 |
| 2010/0024015 A1 * | 1/2010 | Hardt ..................... | H04L 67/14 726/6 |
| 2010/0043065 A1 * | 2/2010 | Bray ................... | H04L 63/0815 726/8 |
| 2011/0107410 A1 * | 5/2011 | Dargis .............................. | 726/9 |
| 2013/0263240 A1 * | 10/2013 | Moskovitch ............ | G06F 21/32 726/7 |

* cited by examiner

*Primary Examiner* — Wasika Nipa
(74) *Attorney, Agent, or Firm* — Lowenstein Sandler LLP

(57) ABSTRACT

A method and system for password mediation including identifying an HTTP request issued by a client application executing on a client device, the HTTP request indicating an operation to be performed for a user of the client application at a destination system, obtaining user credentials using the HTTP request, requesting security information for the user with respect to the destination system, determining whether the user is allowed to perform the operation based on the security information, and upon determining that the user is allowed to perform the operation, modifying the HTTP request based on the security information and sending the modified HTTP request to the destination system.

20 Claims, 5 Drawing Sheets

HTTP PASSWORD MEDIATOR

TECHNICAL FIELD

Embodiments of the present disclosure relate to secure access to remote servers and systems and, more particularly, to a password mediation system.

BACKGROUND

Vendors of remote servers or services provide access, e.g., via HTTP requests, to numerous client organizations, such as businesses or educational institutions, for these servers or services. Access to these servers or services typically requires some type of access information, such as one or more passwords and/or other security methods. Actual users of these servers or services are typically members of these organizations, such as employees in the case of business or students and faculty in the case of educational institutions, that need to access these servers or services to carry out tasks for the organization. However, the organizations may not want to share access information, such as passwords, with the member users. Member users could abuse their use privileges or reveal the organization's access information to non-members, which could present a security risk for the organization. Further, upon severance of the member user from the organization, the organization would need to change the access information to prevent the former member user from continuing to access the servers or services, which could require additional resources and inconvenience other member users.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Figure 1:
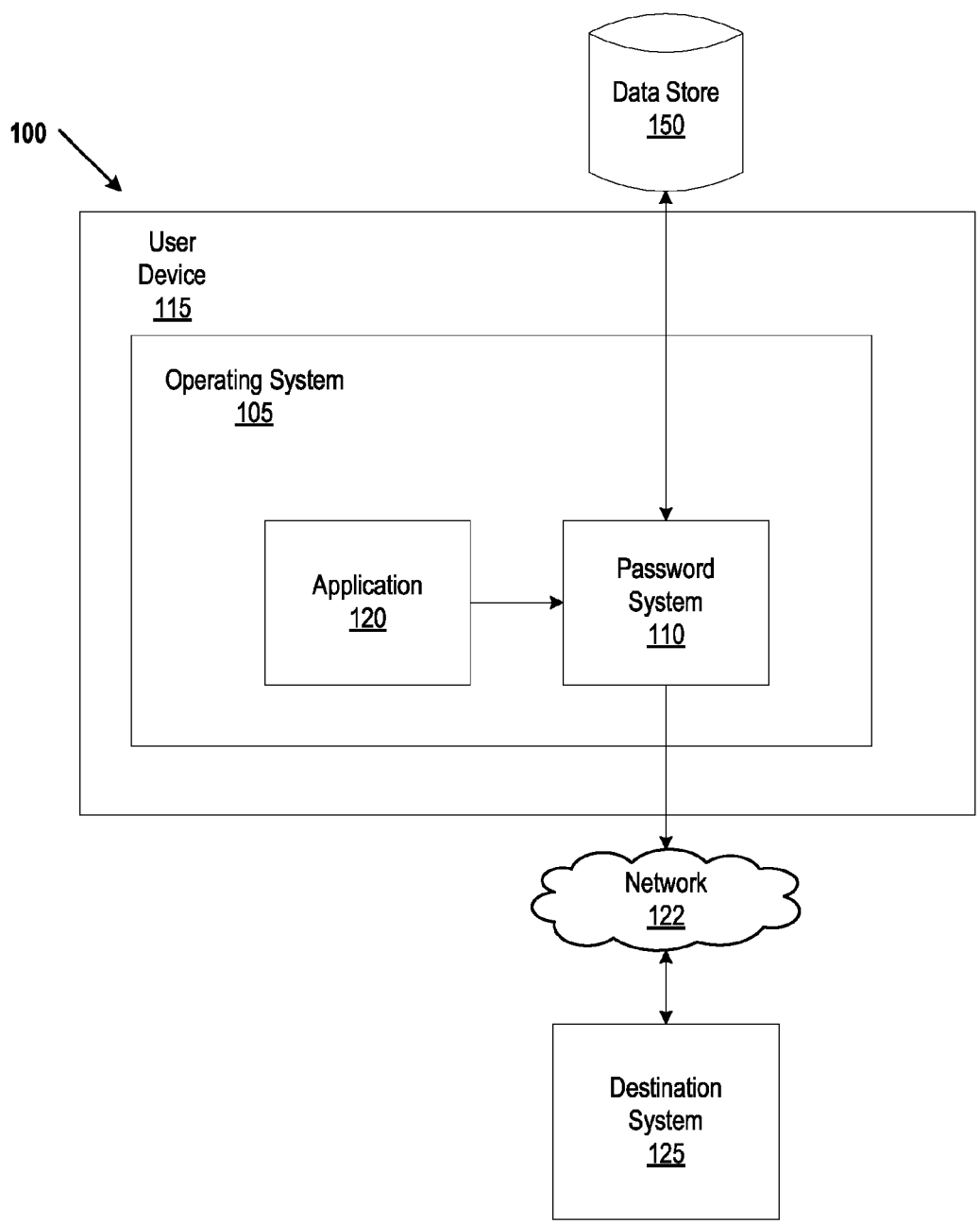
FIG. 1 illustrates exemplary system architecture, in accordance with various embodiments of the present disclosure.

Embodiments of the disclosure are directed to a method and system for password mediation including identifying an HTTP request issued by a client application executing on a user device. The HTTP request indicates an operation to be performed for a user of the client application at a destination system. The password mediation also includes obtaining user credentials using the HTTP request, requesting access information for the user with respect to the destination system, and determining whether the user is allowed to perform the operation based on the access information. Upon determining that the user is allowed to perform the operation, the HTTP request is modified to include access credentials for the destination system and the modified HTTP request is sent to the destination system.

Determining whether the user is allowed to perform the operation can include determining whether the HTTP request contains an HTTP basic credential (e.g., a user name and password), and upon determining that the HTTP request contains the HTTP basic credential, determining whether the user can be identified in an access information database. Upon determining that the user can be identified in the access information database, the access information corresponding to the user can be received from the access information database, and the user can be authorized using rules in the access information, according to one embodiment. It can also be determined whether the user is allowed to perform the requested operation based on the rules in the access information.

Upon determining that the HTTP request does not contain the HTTP basic credential, that the user cannot be identified in the access information database, or that the user is not allowed to perform the requested operation, the unmodified HTTP request can be sent to the destination system. The HTTP request from the user can also be added to a user log.

One embodiment allows authorized member users of a client organization to access remote secured web servers or services without knowledge of access passwords, where the user's access password is not stored on a local machine, and the user does not have knowledge of the authorization protocol. Here, the user can access a remote server or service though the direct access password is hidden from the user, because a password system (or password mediator) can be used to conceal the organization's access password from the user to deter unauthorized use, but still allow access to servers or services. The password system also enables the creation of additional accounts for member users based on the access information (e.g., only one password) for the organization.

Though an HTTP proxy service might be used to augment an HTTP message, this approach requires communication between a remote proxy server and the user. Here, one embodiment provides a modular system that allows numerous kinds of HTTP based authorization to be plugged in on OS level, so there is no need for round trips to a remote HTTP proxy server. Further, though a password manager in a web browser might be used to achieve a similar goal, password managers are unsecure because the passwords are stored in plain text and they can be easily extracted and understood by the user.

FIG. 1 shows a block diagram of a system architecture 100 according to one embodiment. In one embodiment, a user device 115 (e.g., a client device), such as a personal computer, a laptop computer, a cellular telephone, a personal digital assistant (PDA), etc., includes an operating system 105 having a password system 110 that facilitates authentication of application 120 (e.g., a web browser or other application) that runs on top of the operating system 105. The user device 115 may be part of an organization's network. The user device 115 is coupled to a destination system 125 via a network 122 (such as a public network (e.g., the Internet) or a private network (e.g., LAN). In response to user requests to access one or more destination systems 125, the application 120 generates messages for transmission to the destination system(s) 125 via any of the standard protocols for the exchange of information). For example, the messages can be HTTP messages.

The password system 110 (or password mediator) is a module of the operating system (OS) 105, which is able to intercept messages from the application 120 to the destination system 125, and modify the OS's TCP/IP network stack operations. For example, the password system 110 can intercept an HTTP request (e.g., a request to perform an operation) and append security information to the request to support authentication or authorization. To be authorized by the password system 110 against authorization data in a data store 150 (e.g., a database or a repository in communication with or residing on a server, which can be coupled to the user device via a network), the HTTP request can contain an HTTP Basic Authorization header with an encrypted user name and password.

When the password system 110 intercepts an HTTP request, the password system 110 can use the HTTP Basic Authorization header to identify the user in the data store 150 (e.g., in a mediator data store). The data store 150 can include a list of users (e.g., authorized users) and access information (e.g., Allowed Operations Objects (AOOs)) that determine which operations the user can perform on the destination system 125. The password system 110 fetches the corresponding AOO which is associated with the user from the data store 150 and determines whether the user's HTTP request can be sent to destination system. If the user is allowed to perform the operation (e.g., according to rules in the AOO), an authentication method according to an action in the AOO will be applied to the request in the network stack. In other words, the request will be sent on to the destination system 125 with an authentication method and credentials according to the action in the AOO. For example, the request can be modified to include a user name (e.g., an account name) and a user password (e.g., an account password). The request can also be modified to include the operations that the user is allowed to perform, e.g., only view or read files, only view or read a subset of files, modify all files, or modify a subset of files. The password system 110 can also create a log of the request so that the user that performed a particular HTTP request can be determined at a later time.

In one embodiment, each user in the mediator database in the data store 150 has at least one assigned AOO, where the AOO includes of rules and an action. The rules are applied on the HTTP request. In one example, the rules have the following syntax:

```
<RULE>:= <HTTP_PART> <operator> [content]
<HTTP_PART>:= "URL" | "BODY" | <HEADER> | "METHOD"
<HEADER>:= header [header name]
<METHOD>:= "ALL" | "POST" | "GET" | "DELETE" | "PUT" |
"OPTIONS" | "HEAD" |     "CONNECT" | "TRACE"
   <content>:= [ ]
   <operator>:= == | != | like
```

When the rules in the AOO are met, the HTTP request is modified based on the action in the AOO. For example, the action can specify the HTTP authentication method (e.g., HTTP BASIC, HTTP DIGEST, etc.) and the access credentials (e.g., account name and the password), and the HTTP request can be updated to include this information (e.g., in one or more headers of the HTTP request).

In one embodiment, the functionality of the action can be extended by plug-ins. Plug-ins can extend the password system 110 to support a custom HTTP authentication method or to support authentication in situations when HTTP is used as a transport protocol (e.g. SOAP and WS-Security). For example, WS-Security may need specific SOAP headers in an HTTP request, and a plug-in can be implemented by the developer for WS-Security to support the addition of the SOAP headers to the HTTP request before it is forwarded to the destination system.

The following is one example of an AOO.
Rules:
1. URL=http://customer-service.com/secured/modify/*
2. HEADER Accept-Language=cs
3. method=POST
Action:
SET HTTP BASIC AUTH username=John password=securePassword According to one embodiment, a user of the application 120 that sends an HTTP request to a secured destination system does not know what security information (e.g., an authentication method, and access credentials such as a password) is added to the request so the user can not reveal the security information associated with the destination system security, even though the user has access to the destination system.

In one embodiment, even if only one account is available in the destination system 125 for a given organization, an account can be created for each member user that needs access to the destination system in the mediation database in the data store 150 that corresponds to the organization, where allowed operations can be defined for each user through rules in AOO. When a user no longer needs access to the destination system 125 anymore, there need not be a configuration change on the destination system 125 or to the security information for the organization. In this case, the user is just removed from the data store 150.

Figure 2:
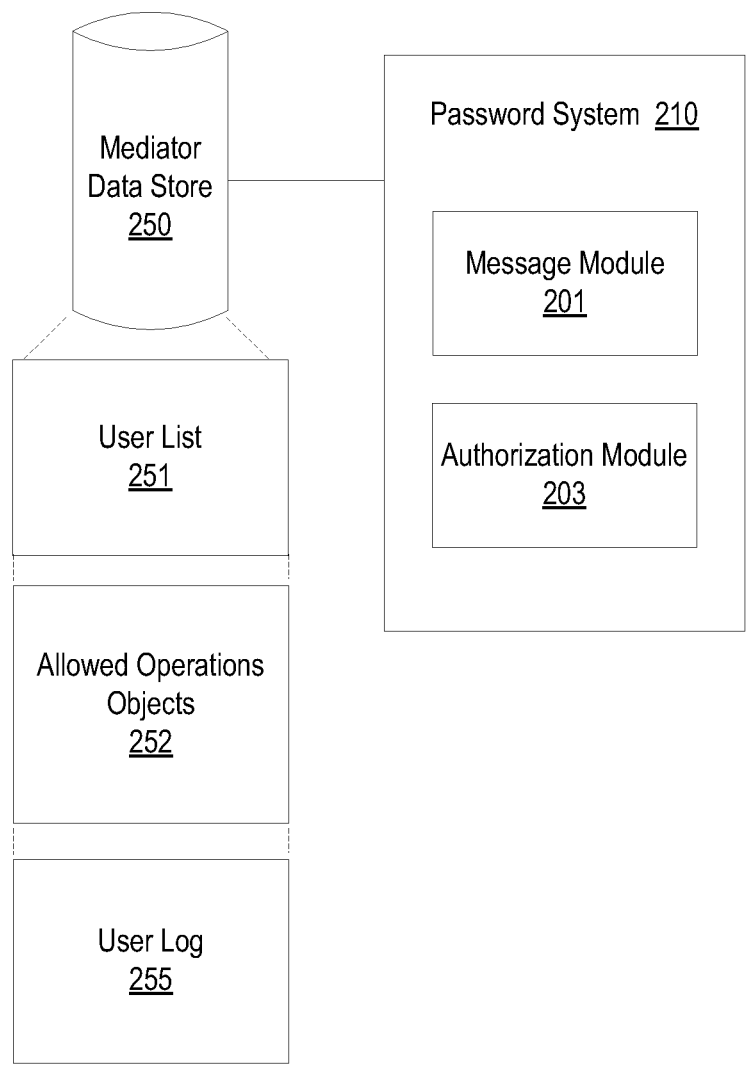
FIG. 2 illustrates a block diagram of an embodiment of a password system and a mediator database.

FIG. 2 illustrates a password system 210 and a mediator data store 250 according to one embodiment. Here, the password system 210 can be the same as the password system 110 of FIG. 1, and the mediator data store 250 can be the same as the data store 150 of FIG. 1. Password system 210 includes a message module 201 and an identification module 203. Note that in alternative embodiments, the password system 210 may include more or less modules than those shown in FIG. 2. Also, one or more of the message module 201 and identification module 203 may be combined into a single module. Additionally, the functionality of any of the message module 201 and identification module 203 may be combined into a single module or may be divided between multiple modules.

Initially, the message module 201 of the password system 210 intercepts a message (e.g., an HTTP request to perform an operation) of an application 120 of an operating system 105 and determines whether the message contains an HTTP basic credential.

If the message contains an HTTP basic credential, then the authorization module 203 of the password system 210 determines if the user can be identified in a user list 251 in the mediator data store 250. For example, the message module 201 extracts and decrypts a user name and password of the user. If the message does not contain an HTTP basic credential, then message module 201 sends an unmodified message to a destination system (e.g., destination system 125 of FIG. 1). For example, the message module 201 does not append security information to the message and forwards the message on to the destination system, so the destination system will not recognize the user as authorized and will not grant the request in the message.

If the user can be identified, then the authorization module 203 identifies the user in the user list 251 in the mediator data store 250 based on the HTTP basic credential. Then, authorization module 203 receives AOO rules from a corresponding AOO from a set of Allowed Operations Objects 252 in the mediator data store 250, e.g., using the decrypted user name and password, and authorizes the user using the AOO rules in the corresponding AOO. If the user can not be identified, then the message module 201 sends an unmodified message to the destination system. For example, the message module 203 does not append security information to the message and forwards the message on to the destination system, so the destination system will not recognize the user as authorized and will not grant the request in the message.

Next, the authorization module 203 determines whether the user is allowed to perform the requested operation. For example, the authorization module 203 determines whether the AOO rules corresponding to at least one AOO have been met. If the user is allowed to perform the requested operation, then the authorization module 203 modifies the message (HTTP request) based on the action corresponding to the AOO. For example, the authorization module 203 applies the security information to the message (e.g., supplying an account name and password). Then, the message module 203 sends the modified message (e.g., the message with the security information appended) on to the destination system. If the user is not allowed to perform the requested operation, then the message module 201 sends an unmodified message to the destination system. For example, the message module 201 does not append security information to the message and forwards the message on to the destination system, so the destination system will not recognize the user as authorized and will not grant the request in the message.

In one embodiment, HTTP requests which are intercepted by the password system 110 are logged in a user log 255 in the mediator data store 250 such that user activity can be tracked.

Figure 3:
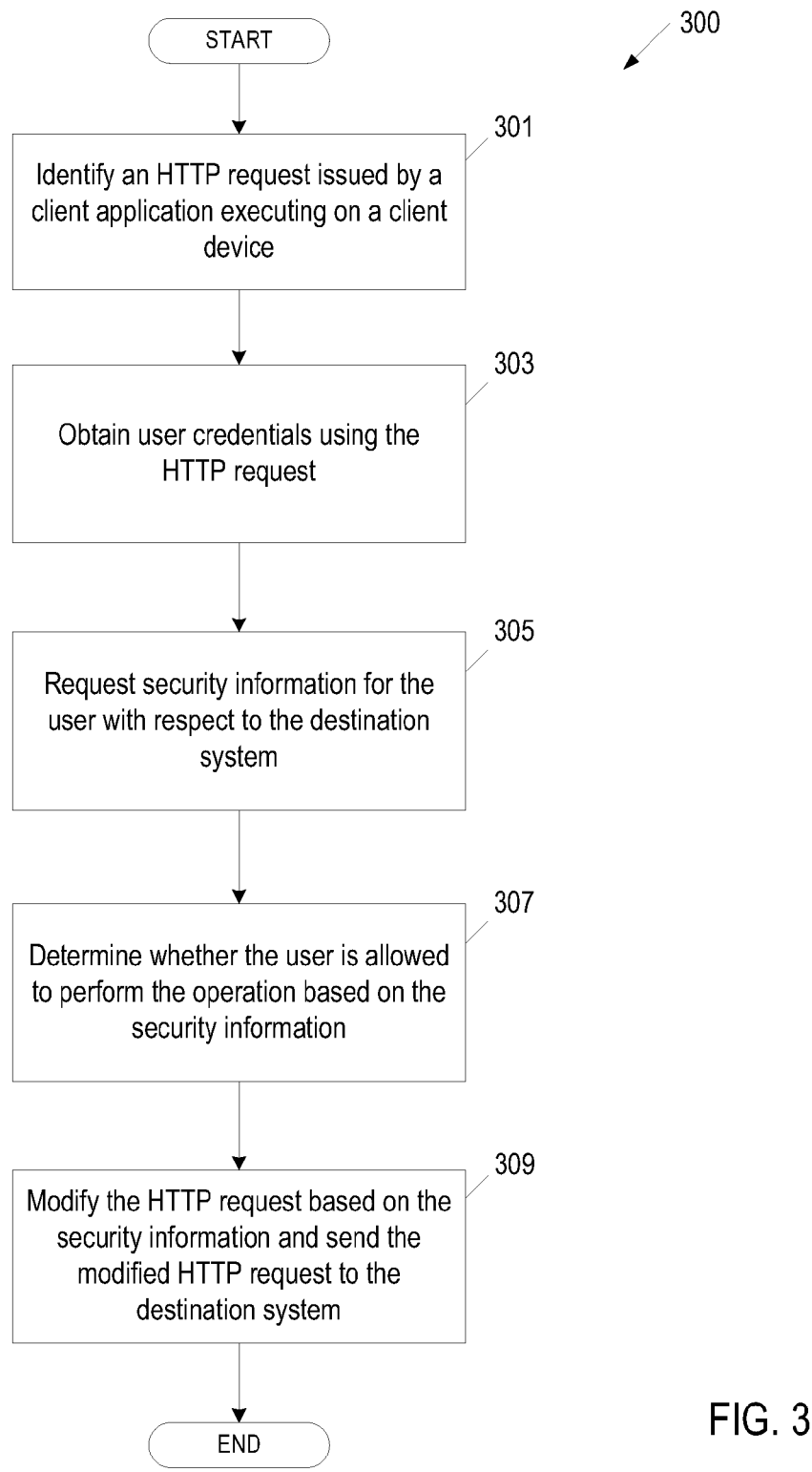
FIG. 3 illustrates a flow diagram of an embodiment of a method of password mediation according to one embodiment.

FIG. 3 illustrates a method 300 of password mediation according to one embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the password system 210 of FIG. 2.

At block 301, the password system 210 identifies an HTTP request issued by a client application executing on a user device. The HTTP request indicates an operation that a user of the client application has requested to perform at a destination system.

At block 303, the password system 210 obtains user credentials using the HTTP request. In one example, the password system 210 intercepts the HTTP request, and the password system 210 uses the HTTP Basic Authorization header to identify the user in the mediator data store 250. For example, the password system 210 can extract and decrypt the user name and password of the user.

At block 305, the password system 210 obtains security information (e.g., an AOO) for the user with respect to the destination system. In one example, the password system 210 determines whether the user is an authorized user in the mediator data store, and if so, retrieves the security information from the mediator data store. In other words, the password system 210 determines whether the organization has designated this user as being authorized to use the server or service associated with the destination system on behalf of the organization, and if so, fetches the security information for the destination system from the mediator data store.

At block 307, the password system 210 determines whether the user is allowed to perform the requested operation based on the security information. In other words, the password system 210 determines whether the organization has designated this user as being authorized to perform the particular operation that the user requested on behalf of the organization. For example, different users may be authorized to perform different operations on the server.

At block 309, if the password system 210 has determined that the user is allowed to perform the requested operation (e.g., based on access information, such as an AOO), then the password system 210 sends a modified request to the destination system (e.g., destination system 125 of FIG. 1). In other words, the password system 210 appends security information (e.g., an authentication method and credentials to the request) and sends the request on to the destination system. The destination system will then receive the modified message and permit the user to perform the requested operation. If the password system 210 does not determine that the user is allowed to perform the requested operation, then an unmodified message (e.g., the message without appended security information) is sent on to the destination system. In this case, the destination system will receive the unmodified message and will not permit the user to perform the requested operation.

Figure 4:
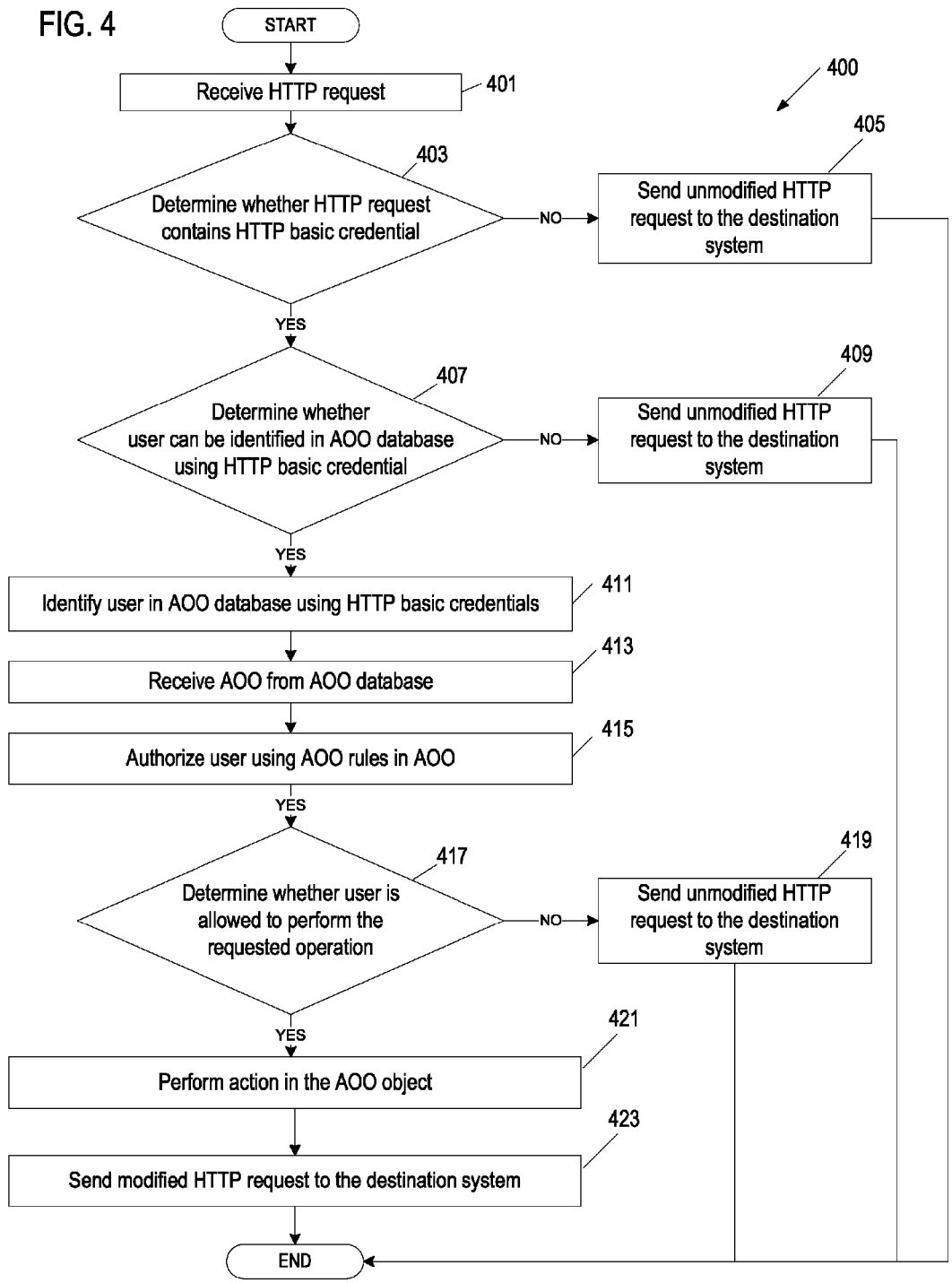
FIG. 4 illustrates a flow diagram of an embodiment of a method of determining whether a user is allowed to perform an operation via a password system according to one embodiment.

FIG. 4 is a flow diagram of an embodiment of a method 400 of determining whether a user is allowed to perform an operation via a password system. The method 400 is performed by processing logic that may comprise hardware (circuitry, dedicated logic, etc.), software (such as is run on a general purpose computer system or a dedicated machine), or a combination of both. In one embodiment, the method 400 is performed by the password system 210 of FIG. 2.

At block 401, the password system 210 receives or intercepts an HTTP request from a user application to destination system to perform an operation. For example, a member user of an organization may send, via an application, a request to access a destination system to update information, such as marketing information.

At block 403, the password system 210 determines whether the HTTP request contains an HTTP basic credential. If the message module 201 determines that the HTTP request does not contain user credentials that have a match in a mediator data store, then the password system 210 sends an unmodified HTTP request to the destination system at block 405. Further to the example above, if the user's request does not include matching HTTP basic credentials, then the HTTP request is sent on to the destination system unmodified such that the destination system will not permit the user to update the marketing information.

If the password system 210 determines that the HTTP request does contain matching HTTP basic credentials, then the password system 210 obtains the AOO from the AOO database 252 at block 413.

Next, at block 417, the password system 210 determines whether the user is allowed to perform the requested operation. If the password system 210 determines that the user is not allowed to perform the requested operation, then the password system 210 sends an unmodified HTTP request to the destination system at block 419. Further to the example above, if the user is not allowed to perform the requested operation, then the HTTP request is sent on to the destination system unmodified such that the destination system will not permit the user to update the marketing information.

If the password system 210 determines that the user is allowed to perform the requested operation, then the password system 210 updates the HTTP request based on the action in the AOO object at block 421, and the password system 210 sends the modified HTTP request (e.g., the HTTP request with access information appended) to the destination system at block 423. Further to the example above, if the user is permitted to perform the requested action, then the modified request is sent to the destination system such that the destination system will permit the user to update the marketing information.

Figure 5:
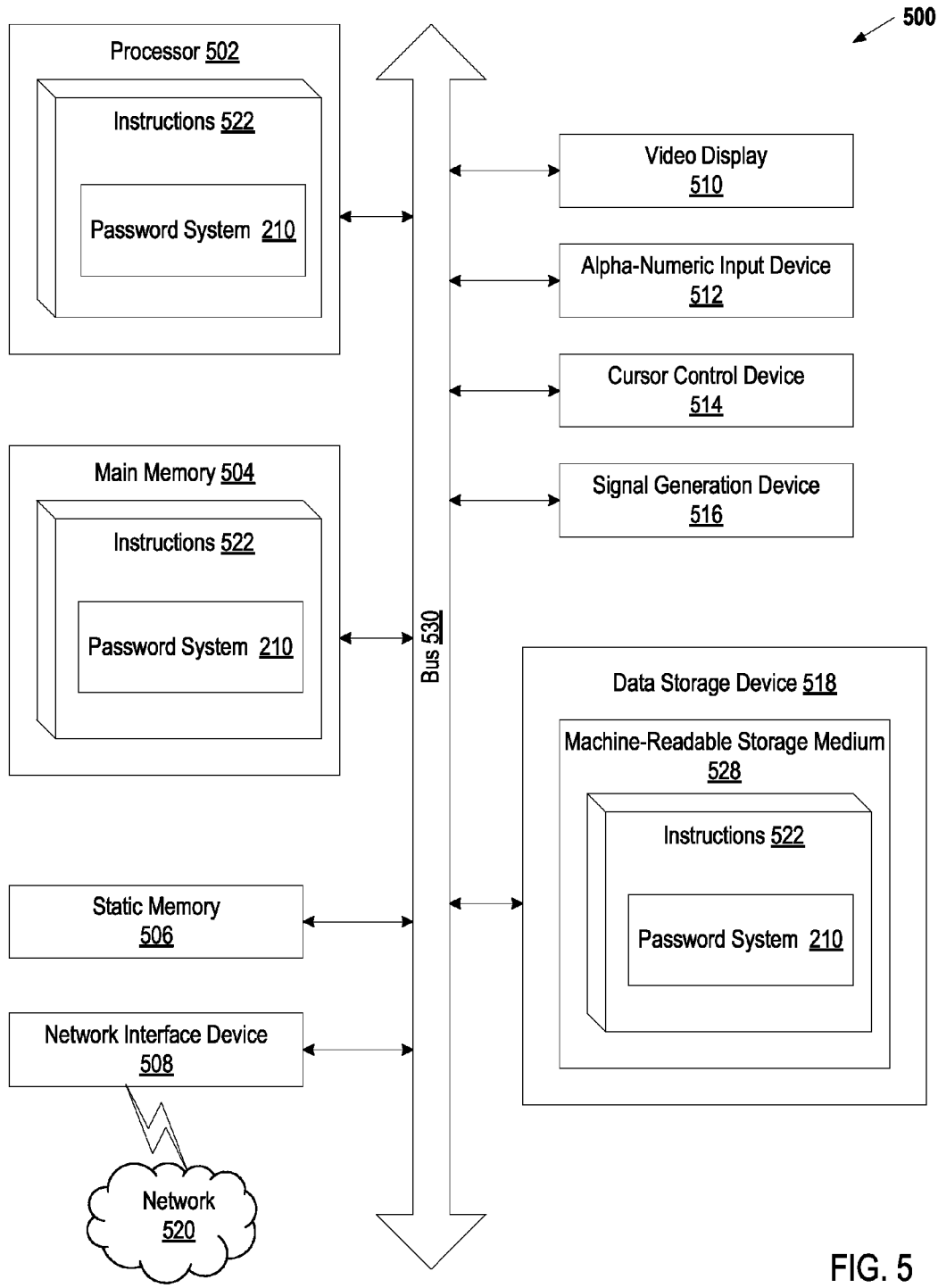
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a password system (e.g., password system 210 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising;
intercepting, within an operating system network stack of a client device, a hypertext transfer protocol (HTTP) request message issued by a client application executing on the client device, the HTTP request message indicating an operation to be performed for a user of the client application at a destination system;
analyzing, by a processing device of the client device, the intercepted HTTP request message to identify the user of the client application;
requesting, by the client device, security information for the user with respect to the destination system, the security information being from a data store and comprising a concealed password that is associated with the user and remains hidden from the user;
determining, by the processing device of the client device, whether the user is allowed to perform the operation in view of the security information;
modifying, by the client device, the intercepted HTTP request message to include the concealed password upon determining that the user is allowed to perform the operation; and
sending, by the client device, the modified HTTP request message to the destination system.

2. The method of claim 1, wherein determining whether the user is allowed to perform the operation comprises:
determining whether the HTTP request message contains an HTTP basic credential;
upon determining that the HTTP request message contains the HTTP basic credential, determining whether the user can be identified in the data store;
upon determining that the user can be identified in the data store, identifying the user in the data store, and obtaining the security information from the data store; and
determining whether the user is allowed to perform the requested operation in view of the rules in the security information.

3. The method of claim 2 further comprising upon determining that the HTTP request message does not contain the HTTP basic credential, sending the HTTP request message unmodified to the destination system.

4. The method of claim 2 further comprising upon determining that the user cannot be identified in the data store, sending the HTTP request message unmodified to the destination system.

5. The method of claim 2 further comprising upon determining that the user is not allowed to perform the requested operation, sending the HTTP request message unmodified to the destination system.

6. The method of claim 1, wherein the modified HTTP request message comprises the HTTP request message with a portion of the security information appended.

7. The method of claim 1 further comprising recording the HTTP request message from the user application to a user log.

8. A system comprising:
a memory; and
a processing device of a client device, the processing device operatively coupled to the memory, the processing device to:
intercept a hypertext transfer protocol (HTTP) request message within an operating system network stack of the client device, wherein the HTTP request message is issued by a client application executing on the client device and indicates an operation to be performed by a user of the client application at a destination system;
analyze the intercepted HTTP request message to identify the user of the client application;
request security information for the user with respect to the destination system, the security information being from a data store and comprising a concealed password that is associated with the user and remains hidden from the user;
determine whether the user is allowed to perform the operation in view of the security information;
modify the intercepted HTTP request message to include the concealed password upon determining that the user is allowed to perform the operation; and
send the modified HTTP request message to the destination system.

9. The system of claim 8, wherein to determine whether the user is allowed to perform the operation, the processing device is further to:
determine whether the HTTP request message contains an HTTP basic credential;
upon determining that the HTTP request message contains the HTTP basic credential, determine whether the user can be identified in the data store;
upon determining that the user can be identified in the data store, identify the user in the data store, and obtaining the security information from the data store; and
determine whether the user is allowed to perform the requested operation in view of the rules in the security information.

10. The system of claim 9, wherein the processing device is further to, upon determining that the HTTP request message does not contain the HTTP basic credential, send the HTTP request message unmodified to the destination system.

11. The system of claim 9, wherein the processing device is further to, upon determining that the user cannot be identified in the data store, send the HTTP request message unmodified to the destination system.

12. The system of claim 9, wherein the processing device is further to, upon determining that the user is not allowed to perform the requested operation, send the HTTP request message unmodified to the destination system.

13. The system of claim 8, wherein the modified HTTP request message comprises the HTTP request message with a portion of the security information appended.

14. A non-transitory computer-readable storage medium including instructions that cause a processing device of a client device to:
intercept, within an operating system network stack of the client device, a hypertext transfer protocol (HTTP) request message issued by a client application executing on the client device, the HTTP request message indicating an operation to be performed for a user of the client application at a destination system;
analyze, by the processing device of the client device, the intercepted HTTP request message to identify the user of the client application;

request, by the client device, security information for the user with respect to the destination system, the security information being from a data store and comprising a concealed password that is associated with the user and remains hidden from the user;

determine, by the processing device of the client device, whether the user is allowed to perform the operation in view of the security information;

modify, by the client device, the intercepted HTTP request message to include the concealed password upon determining that the user is allowed to perform the operation; and send, by the client device, the modified HTTP request message to the destination system.

15. The non-transitory computer-readable storage medium of claim 14, wherein the instructions further cause the processing device to:

determine whether the HTTP request message contains an HTTP basic credential;

upon determining that the HTTP request message contains the HTTP basic credential, determine whether the user can be identified in the data store;

upon determining that the user can be identified in the data store, identify the user in the data store, and obtain the security information from the data store; and determine whether the user is allowed to perform the requested operation in view of the rules in the security information.

16. The non-transitory computer-readable storage medium of claim 15, wherein the instructions further cause the processing device to send the HTTP request message unmodified to the destination system upon determining that the HTTP request message does not contain the HTTP basic credential.

17. The non-transitory computer-readable storage medium of claim 15, wherein the instruction further cause the processing device to send the HTTP request message unmodified to the destination system upon determining that the user cannot be identified in the data store.

18. The non-transitory computer-readable storage medium of claim 14, wherein the modified HTTP request message comprises the HTTP request message with a portion of the security information appended.

19. The method of claim 1, wherein the concealed password is an access password for an organization and is shared by a plurality of users of the organization.

20. The system of claim 8, wherein the concealed password is an access password for an organization and is shared by a plurality of users of the organization.

* * * * *